United States Patent [19]
Yasumura

[11] Patent Number: 5,918,231
[45] Date of Patent: Jun. 29, 1999

[54] OBJECT-ORIENTED DATABASE MANAGEMENT SYSTEM WITH IMPROVED USAGE EFFICIENCY OF MAIN MEMORY

[75] Inventor: Yoshitaka Yasumura, Tokyo, Japan

[73] Assignee: NEC Corporation, Tokyo, Japan

[21] Appl. No.: 08/606,804

[22] Filed: Feb. 26, 1996

[30] Foreign Application Priority Data

Feb. 24, 1995 [JP] Japan .................................. 7-062157

[51] Int. Cl.⁶ .................................................. G06F 17/30
[52] U.S. Cl. .............................. 707/103; 707/3; 707/10; 395/500
[58] Field of Search ................................. 395/500, 602, 395/614, 612, 613; 702/10, 103, 3

[56] References Cited

U.S. PATENT DOCUMENTS

| | | | |
|---|---|---|---|
| 5,291,583 | 3/1994 | Bapat ...................................... | 395/500 |
| 5,295,256 | 3/1994 | Bapat ...................................... | 395/500 |
| 5,297,279 | 3/1994 | Bannon et al. .......................... | 395/614 |
| 5,455,945 | 10/1895 | VanderDrift ............................ | 395/602 |
| 5,542,078 | 7/1996 | Martel et al. ........................... | 395/612 |
| 5,560,005 | 9/1996 | Hoover et al. .......................... | 707/10 |
| 5,611,076 | 3/1997 | Durflinger et al. ..................... | 395/613 |
| 5,617,567 | 4/1997 | Doktor .................................... | 395/602 |
| 5,713,014 | 1/1998 | Durflinger et al. ..................... | 1/1 |
| 5,752,028 | 5/1998 | Ellacott .................................. | 707/103 |
| 5,765,159 | 6/1998 | Srinivasan .............................. | 707/102 |
| 5,774,692 | 6/1998 | Boyer et al. ............................ | 395/500 |
| 5,862,535 | 10/1997 | Knudsen ................................. | 395/701 |

FOREIGN PATENT DOCUMENTS

| | | | |
|---|---|---|---|
| 04215185 | 8/1992 | Japan ........................................ | 15/40 |
| 4-215185 | 8/1992 | Japan .............................. G06F | 15/40 |

OTHER PUBLICATIONS

"Hashing Method based on Dynamic Processing Bucket Selection Method and Evaluation of Its Performance", Information Processing Society of Japan, Collection of Papers vol. 30, No. 8, pp. 1024–1032, No Date.

Kitsuregawa et al. "Hash Join Processing Method Based on Dynamic Processing Bucket Selecting Means and Its Performance Evaluation", Journal of Information Processing Society Thesis, vol. 30, n. 8 (English translation), Aug. 1989.

Bertino et al. "Object–Oriented Database Management Systems: Concepts and Issues", Computer Magazine, v24, n4, p33–47, Apr. 1991.

Biliris et al. "A High Performance Configurable Storage Manager", Data Engineering, 1995 11th Int.'l Conference, pp. 35–43, 1995.

*Primary Examiner*—Thomas G. Black
*Assistant Examiner*—Charles L. Rones
*Attorney, Agent, or Firm*—Foley & Lardner

[57] ABSTRACT

An object-oriented database management system comprises a query processing system for controlling an entire query processing and a database access system which is connected to a database and performs access to the database according to a query from the query processing system. The system performs operation processing, wherein the database access system includes a pointer retrieving part which retrieves, from the database, all pointers to joined keys described in a query conditional expression produced from the query processing system, prior to the join operation, and produces a set of pointers to the joined keys. A join operation part uses the set of pointers produced by the pointer retrieving part to perform the join operation and to evaluate the query conditional expression while acquiring a concatenated key value.

12 Claims, 10 Drawing Sheets

OBJECT-ORIENTED DATABASE MANAGEMENT SYSTEM WITH IMPROVED USAGE EFFICIENCY OF MAIN MEMORY

BACKGROUNDS OF THE INVENTION

1. Field of the Invention

The invention relates to an object-oriented database management system for performing join operations in order to efficiently process a query including a conditional expression which needs to trace a pointer reference.

2. Description of the Related Art

An object-oriented database is a database which manages an object having data and its operation procedure combined as one unit. Each object has an identifier to uniquely identify it, and this identifier is called an object identifier. Respective objects are divided into a category having a common attribute value and an operation procedure, and this category is called a class. In the database, a subset or universal set which belongs to a certain single class is stored and managed as a meaningful set. Processing which selectively processes a given object set from a set of objects stored in the database is called query processing. To request such query processing, its type is designated by the conditional expression.

Meanwhile, object-oriented database management systems have been developed that are designed to be able to write as a pointer to the object identifier of another object into a query conditional expression. Generally, since the object identifier is produced based on an address in a disk area on which the applicable object to be identified by the applicable object identifier is disposed, it also indicates physical page information on the applicable object.

For example, in the case that Hotel A has a reservation instance for each reservation, a pointer (object identifier of guest instance) to a guest instance is set in the reservation instance and a pointer to the guest name is set in the guest instance, a set of names of guests who have made a reservation at Hotel A can be described by using a mark "→" which indicates the pointer reference, for instance, as follows:

Hotel·set of reservations→guests→names. And, in the case that Company B has an employee instance for each employee and a pointer to an employee name is set in the employee instance, a set of names of the employees of the company can be described by using the pointer reference, for instance, as follows:

Company·set of employees→names. Consequently, a query conditional expression "to retrieve an employee of Company B who has made a reservation at Hotel A" can be expressed as follows:

Hotel·set of reservations→guests→names==company·set of employees→names.

When performing such query processing, which has the conditional expression containing the pointer reference as described above, whenever the name of a guest having made a reservation at Hotel A is retrieved by tracing the pointer, it is checked whether the above name is one of the employees of Company B. But, to check the one employee of Company B, such a method needs to access all employee names for each name of the guests at Hotel A, and when the query is made with respect to a large-scale object set, processing efficiency is quite poor.

In view of the above circumstances, the invention employs a join operation which concatenates elements agreeable between sets to realize efficient processing of a query which includes a pointer reference in a conditional expression. And, utilizing the speciality of the object-oriented database, which contains a pointer reference in a conditional expression, a set, which forms input information at the time of a join operation, is made not of concatenated key values themselves but of a set of pointers to the concatenated key, thereby reducing the required memory area for holding input information at the time of the join operation.

The join operation is a method which is also used for the relational database, and the following are known.

(A) nested loop method
(B) sort-merge method
(C) hashing method

Among the above methods, the hashing method requires the least amount of data comparison at the time of the join operation. Information Processing Society of Japan, Collection of Papers Vol. 30, No. 8 has on pp. 1024–1032 a paper entitled "Hashing Method based on Dynamic Processing Bucket Selection Method and Evaluation of Its Performance", which introduces three classical hashing methods such as a simple GRACE method, a multi-split GRACE method, and a hybrid hashing method. And, it also introduces a dynamic processing bucket selection type join operation processing method, as an improved method.

This dynamic processing bucket selection type join operation processing method adopts an algorithm which combines the multi-split GRACE method which previously takes a large number of buckets to be divided and the hybrid hashing method which partially overlaps the split phase processing and the join phase processing to reduce the I/O cost so that a bucket exceeding the main memory size is prevented from being produced even when the data distribution is varied. And, while the hybrid hashing method determines a bucket to statically perform the overlap processing, the improved method dynamically selects the bucket by the split phase to keep a high processing efficiency without depending on the data distribution of each bucket. Furthermore, the increase in I/O cost to a fragment page, which is caused when a large number of split buckets is provided in advance or the multi-split is made, is solved by performing integration processing prior to the join phase processing.

However, such a conventional join operation technology using a hash function does not secure dynamically the page used by each bucket, having a disadvantage that the usage efficiency of the main memory is poor.

SUMMARY OF THE INVENTION

A first object of the invention is to remedy the above existing drawbacks and to provide an object-oriented database management system which improves the usage efficiency of the main memory when a join operation is performed using a hash function.

According to one aspect of the invention, an object-oriented database management system comprising a query processing system for controlling the entire query processing and a database access system which is connected to a database and performs access to the database according to a query from the query processing system to perform operation processing, wherein the database access system includes a pointer retrieving means for retrieving all pointers to joined keys described in a query conditional expression from the query processing system from the database prior to the join operation and producing a set of pointers to the joined keys, and join operation means for performing the join operation to evaluate the query conditional expression while acquiring a concatenated key value by using the set of pointers produced by the pointer retrieving means.

In the preferred construction, the pointer retrieving means acquires pointers (to be traced to obtain the concatenated key value which is required at the join operation) one by one in turn while sorting with the pointers as keys, and stores a pointer to the finally acquired concatenated key as a pair with the object identifier, which is subject to the join into the set of pointers.

Also, the join operation means manages pages of an operation buffer to be used for a bucket by a blank page list, and also produces a hash value for the joined keys by using a hash function, the pages of the operation buffer are dynamically acquired from the blank page to be used as a split bucket for storing data split based on the hash value, and holds the split bucket as a logical link of the pages split into many split bucket numbers.

In the above-mentioned construction, the join operation means converts the hash value for the joined keys produced by using the hash function in terms of either one between two sets, which are subject to the join operation, into a converted bit value with a given number as the maximum value by a hash value conversion function, and registers the converted bit value in a bit filter, and converts the hash value for the joined keys produced by using the hash function in terms of the other set into a bit value by the hash value conversion function, and focuses on elements to be processed from the converted bit values by referring to the bit file.

In the above-mentioned construction, the join operation means manages pages of an operation buffer to be used for a bucket by a blank page list, and also dynamically acquires the pages of the operation buffer to be used for a join bucket from the blank page list and holds the join bucket as a logical link of the pages split into many split bucket numbers.

In the above-mentioned construction, the join operation means, when the elements of one of the sets to be concatenated have data expanded based on the hash value, changes an algorithm for join operation to be performed when all elements are placed on the main memory. Also, the join operation means, when it is necessary to acquire a final result according to a request from the query processing system, temporarily accumulates the result of the join operation in an output buffer and produce a result set by collecting the acquired operation results after the completion of all operations.

According to another aspect of the invention, an object-oriented database management system comprising a query processing system for controlling the entire query processing and a database access system which is connected to database and performs access to the database according to an query from the query processing system to perform operation processing, wherein the database access system includes pointer retrieving means for retrieving all pointers to joined keys described in a query conditional expression from the query processing system from the database prior to the join operation and for producing a set of pointers to the joined keys, and join operation means for performing the join operation to evaluate the query conditional expression while acquiring a concatenated key value by using the set of pointers produced by the pointer retrieving means;

the pointer retrieving means acquires pointers to be traced to obtain the concatenated key value, which is required at the join operation, one by one in turn while sorting with them as keys, and stores a pointer to the finally acquired concatenated key as a pair with the object identifier which is subject to the join into the set of pointers; and the join operation means manages pages of an operation buffer to be used for a bucket by a blank page list, and also produces a hash value for the joined keys by using a hash function, the pages of the operation buffer are dynamically acquired from the blank page list to be used as a split bucket for storing data split based on the hash value, and holds the split bucket as a logical link of the pages split into many split bucket numbers numbers.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Preferred embodiments of the invention will be described in detail with reference to the accompanying drawings.

Figure 1:
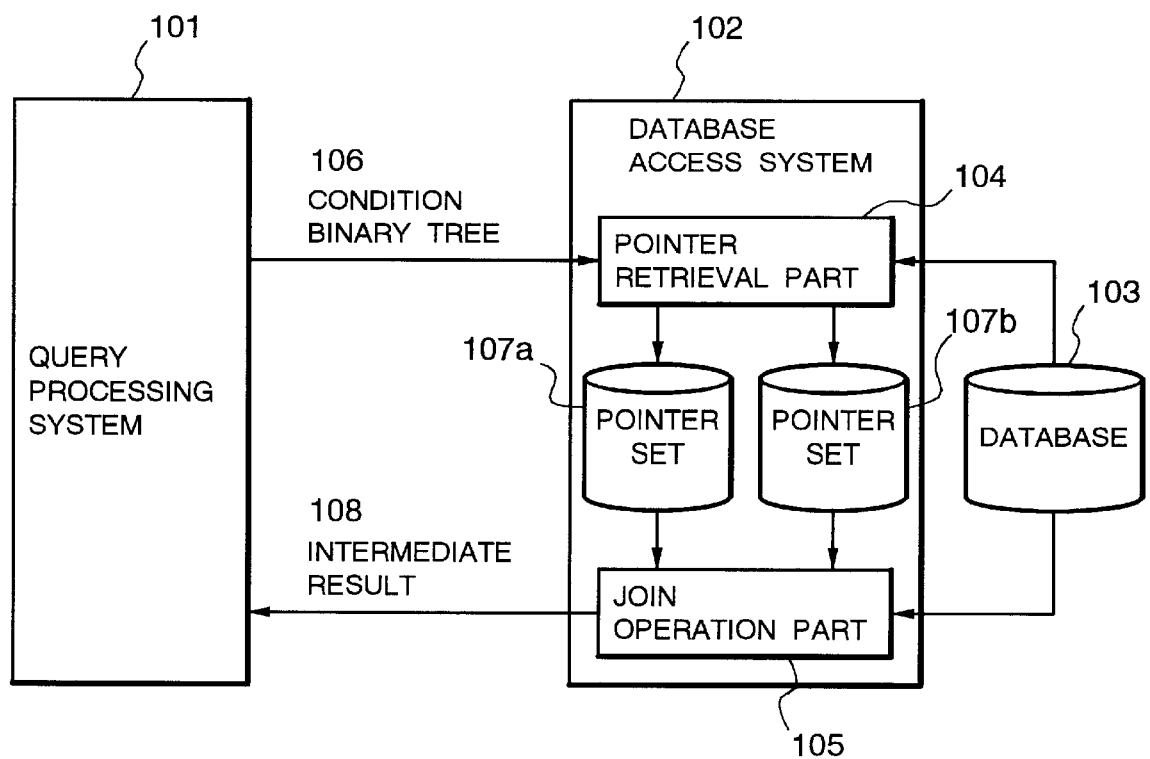
FIG. 1 is a block diagram showing a configuration of the object-oriented database management system according to the first embodiment of the invention.

FIG. 1 is a block diagram showing a configuration of the object-oriented database management system according to the first embodiment of the invention.

As shown in the drawing, the object-oriented database management system of this embodiment includes a query processing system 101 for controlling the entire query processing and a database access system 102 for performing a join operation and other operations, and database 103 that is connected to the database access system 102. This drawing simply shows the characteristic components of the embodiments and omits other minor components.

The database access system 102 receives a condition binary tree 106 concerning a query from the query processing system 101, and returns an intermediate result 108, the result of the join operation, to the query processing system 101. As illustrated, the database access system 102 comprises a pointer retrieval part 104 for acquiring a pointer (object identifier) that will be needed and a join operation part 105 for performing a join operation using a hash function.

The pointer retrieval part 104 is a program-controlled CPU or the like, and accesses the database 103 to produce some pointer sets 107a, 107b. It is to be understood that although this embodiment is described in connection with two produced pointer sets, various numbers of pointer sets can be produced according to the conditional expression.

The join operation part 105 is a program-controlled CPU or the like, and acquires the required concatenated key value from the database 103 upon receiving the pointer sets 107a, 107b produced in the pointer retrieval part 104. The join operation part 105, when the final result is required upon request from the query processing system 101, temporarily stores each result of the join operation within an output buffer, and collectively produces a set of results upon the completion of an operation.

Operation of the embodiment will be described specifically. For example, it is assumed that the database 103 includes the reservation instance for each reservation at Hotel A, in which the pointers (object identifiers of guest instance) to the guest instance are set and the pointer to the names of the guests is set in the guest instance, and the employee instance for each employee of Company B, in which the pointers to the names of the employees are set. And, with the following conditional expression designated, hotel·set of reservations→guests→names==company·set of employees→names there is an query "to retrieve an employee of Company B who has made a reservation at Hotel A". Here, "hotel·set of reservations" indicates a set of reservation instance to indicate the reservation condition of Hotel A, and "company·set of employees" indicates a set of the "employee instance of Company B".

In the case of responding to such a query, in the left side member of the conditional expression, it is necessary that the pointer to the guest instance defined in the reservation instance is traced to refer to the guest instance, and the pointer to the names defined in the guest instance is traced to refer to the name. And, in the right side member of the conditional expression, it is necessary that the pointer to the names defined in the employee instance is traced to refer to the name.

Descriptions will be made in detail of each operation in connection with the production of the pointer set by the pointer retrieval part 104 and the join operation by the join operation part 105.

(1) Operation of pointer retrieval part 104.

Upon receiving the aforementioned query, the query processing system 101 analyzes the query, produces the condition binary tree 106 which corresponds to the query, and gives it to the pointer retrieval part 104 of the database access system 102. The condition binary tree 106 indicates the query conditional expression in the form of a tree structure, showing the conditions of the right and left side members of the conditional expression. The conditions of the left side member of the condition binary tree 106 write the pointer into the binary tree of the reservation instance set, while the conditions of the right side member write the pointer into the binary tree of the employee instance set.

Figure 2:
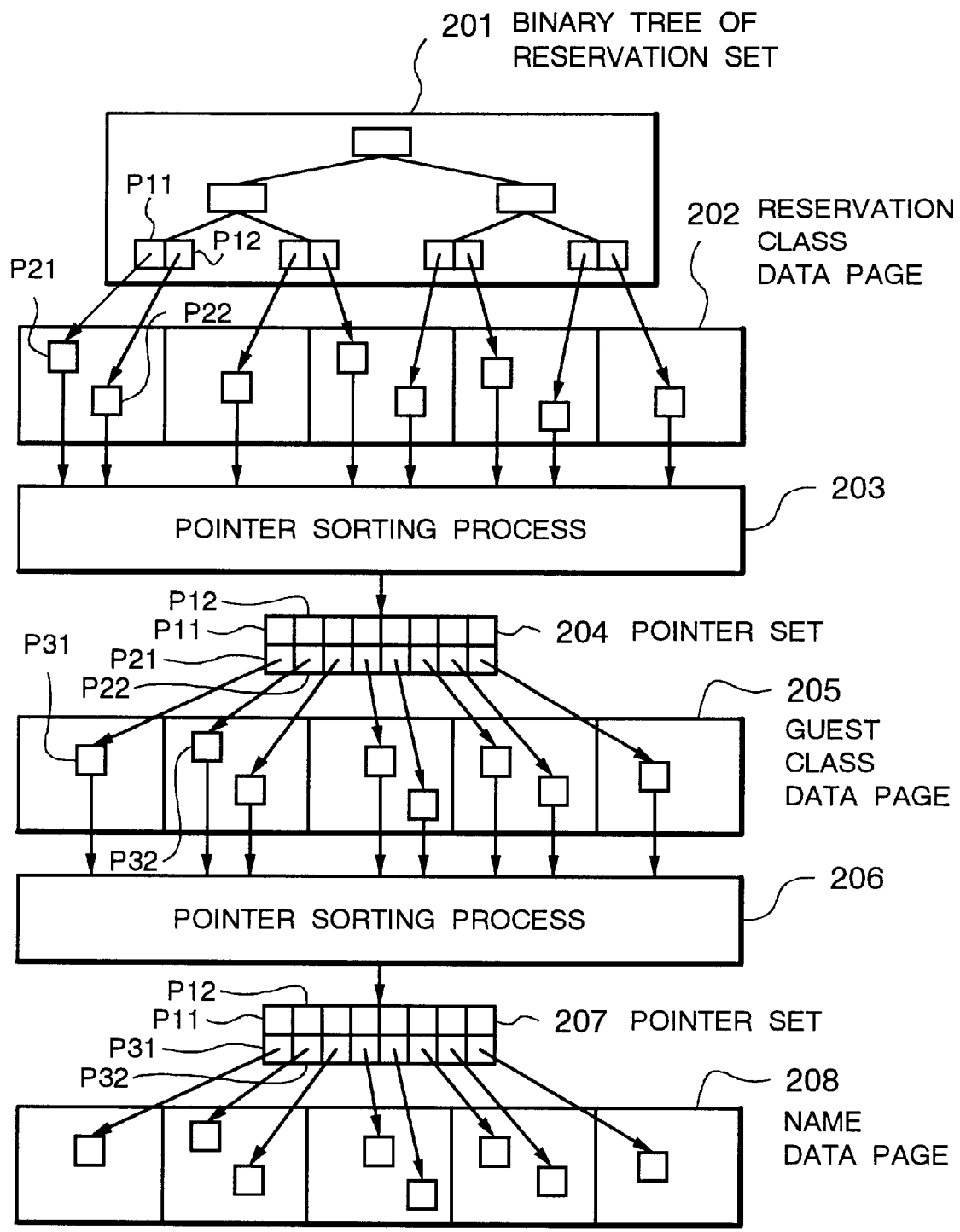
FIG. 2 is an explanatory diagram showing the operation of the pointer retrieval part of the embodiment.

The pointer retrieval part 104, according to the received condition binary tree 106, first produces a pointer set corresponding to the left side member of the conditional expression, and then produces another pointer set corresponding to the right side member of the conditional expression. In FIG. 2, reference numeral 201 designates an example of the binary tree of the reservation instance set. As shown in the drawing, the nodes of the binary tree include object identifiers P11, P12, . . . of the reservation instance. Though not shown, the nodes of the binary tree for the employee instance set also include object identifiers of the employee instance.

Figure 3:
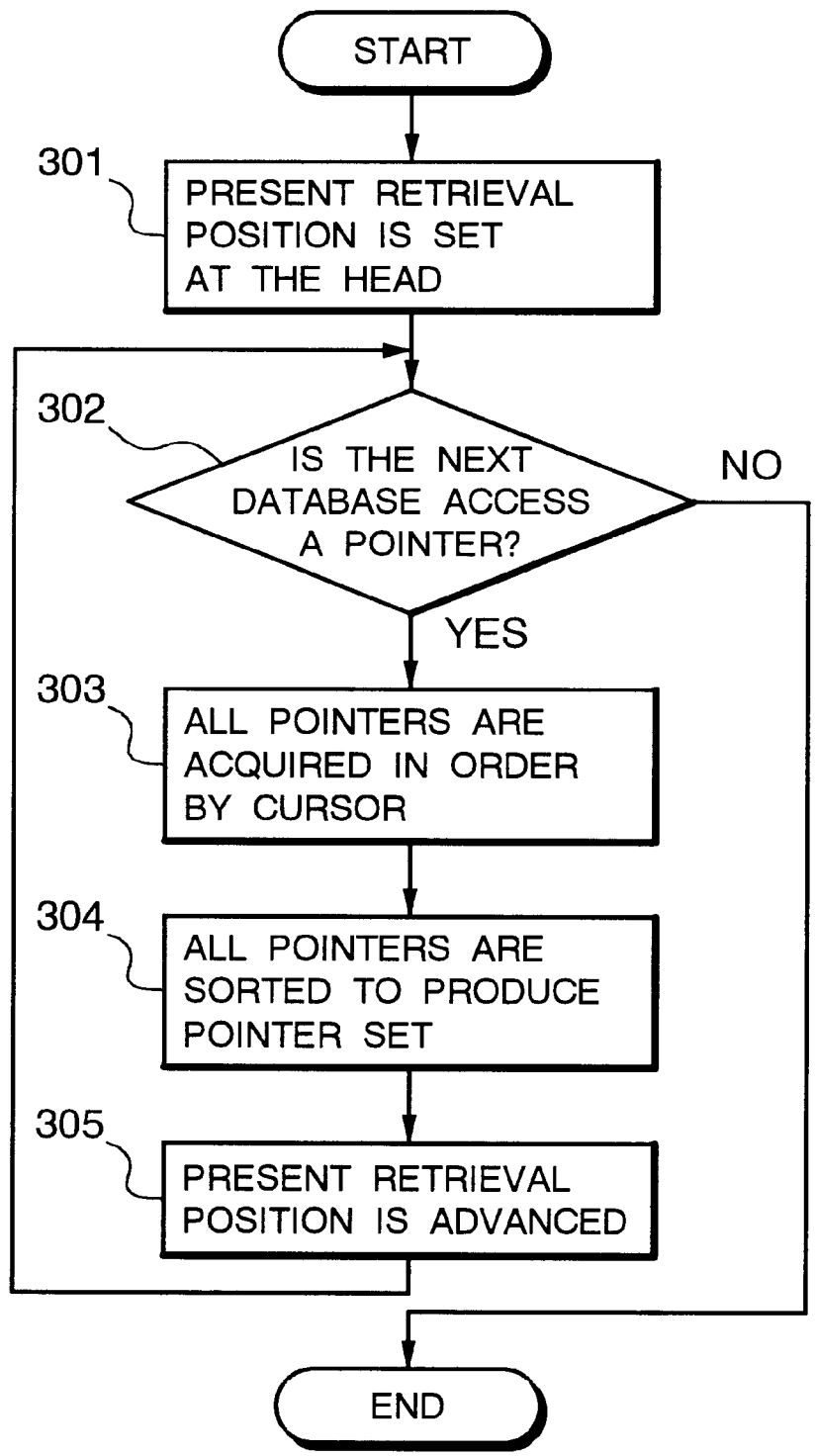
FIG. 3 is a flowchart showing the process to produce the pointer set by the pointer retrieval part of the embodiment.

FIG. 3 is a flowchart showing the process to produce the pointer set by the pointer retrieval part 104.

First, description will be made of the production of the pointer set concerning the left side member of the conditional expression.

The retrieval position of the current pointer is first set to the forefront pointer (the pointer from hotel, set of reservations to guest instance) (step 301). Then, as shown in FIG. 2, by means of the function of the cursor, all pointers (pointers from reservation instance to guest instance) P21, P22, . . . are taken from a reservation class data page 202 which contains a set of reservation instances in the database 103 in ascending order of the object identifiers P11, P12, . . . of the reservation instances. All pairs of the object identifiers P11, P12, . . . of the reservation instance and the pointers P21, P23, . . . are determined (step 303). Then, all of the obtained pairs are subjected to a pointer sorting process 203 to sort in ascending order of the pointers P21, P22, . . . to produce a pointer set 204 (step 304).

The retrieval position of the current pointer is then advanced to the next pointer (pointer from guests to names) (step 305), and steps 303, 304 are performed. Specifically, as shown in FIG. 2, all pointers (pointers from the guest instance to names) P31, P32, . . . are acquired in order from a guest class data page 205 which contains the guest instance set in the database 103 in the arranged order in the pointer set 204 after sorting. At the time, the pointers P21, P22, . . . are sorted in ascending order and each pointer (=object identifier) indicates physical page information on the data page 205 which stores the guest instance, so that the guest class data page 205 is accessed in ascending order, thereby suppressing an excessive input to or output from a disk.

If the above sorting is not performed, the guest data page 205 is accessed in a given order, so that when the database size is larger than a cache size, the same page might be repeatedly loaded onto the cache, causing excess input to and output from the disk. But, the present invention makes accesses after sorting all of the obtained pointers P21, P22, . . . , thereby remedying excess input to and output from the disk which might be caused when the same page is repeatedly accessed.

Then, pointers P31, P32, . . . , determined by the above process, are paired with the object identifiers P11, P12, . . . of the reservation instance. And, all pairs are sorted in ascending order of the pointers P31, P32, . . . by a pointer sorting process 206 to produce a pointer set 207 (step 304). The pointers P31, P32, . . . of each pair in the pointer set 207 have referred to a data page 208 for storing the guest names in ascending order for the same reasons as explained above.

Succeedingly, the pointer retrieval part 104 advances the current retrieval position, however, when there is no pointer reference in the left side member of the conditional expression (NO in step 302), processing is completed, and the finally produced pointer set 207 is outputted as a pointer set 107a as shown in FIG. 1.

In the same way as in the process shown in FIG. 3, the pointer retrieval part 104 produces a pointer set 107b which is associated with the right side member of the conditional expression. The produced pointer set 107b is a set of the paired pointer (pointer from the employee instance to the name) and object identifier of the employee instance and sorted in ascending order by the pointer.

(2) Operation of join operation part 105.

Figure 4:
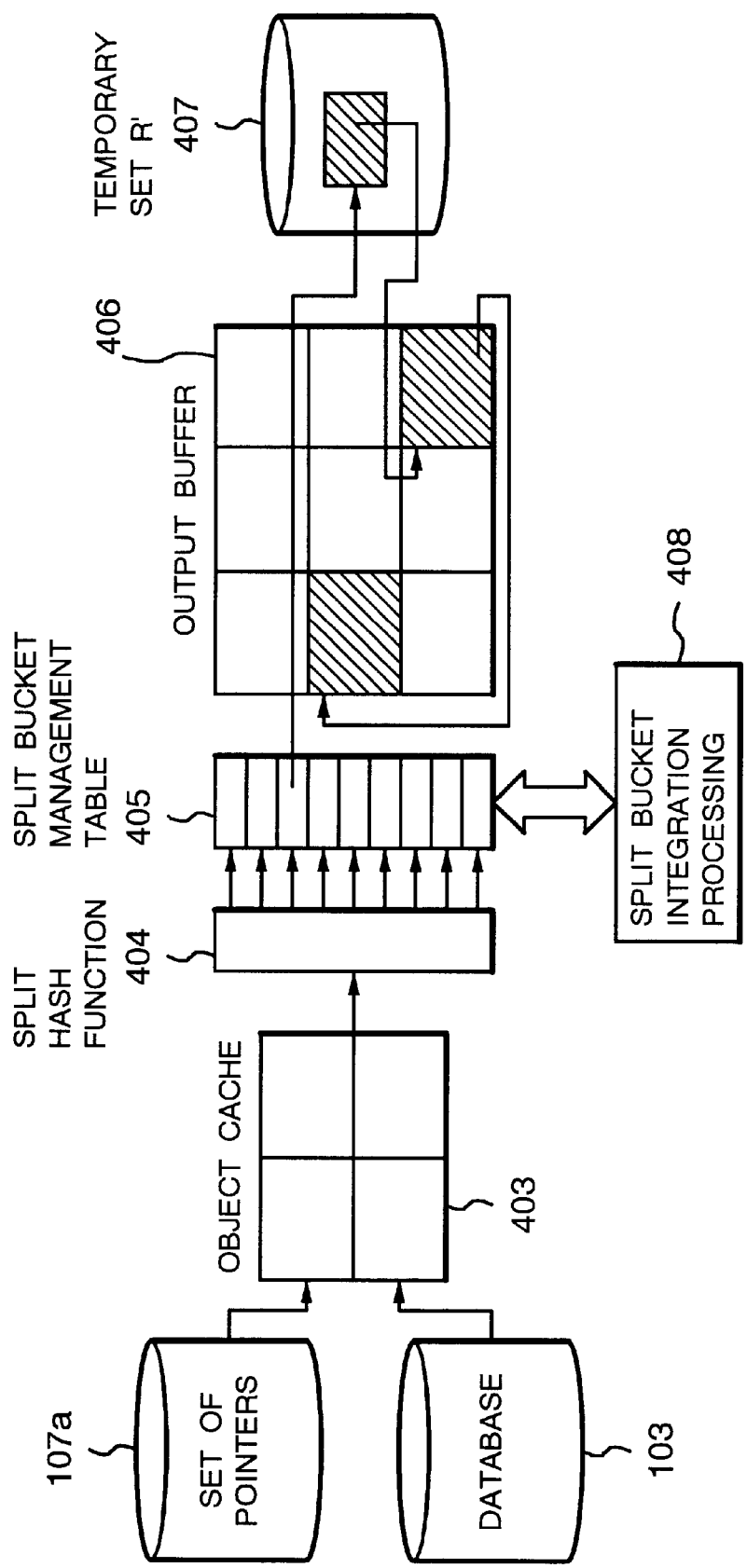
FIG. 4 is an explanatory diagram showing the operation of the split phase in the join operation part of the embodiment.
Figure 5:
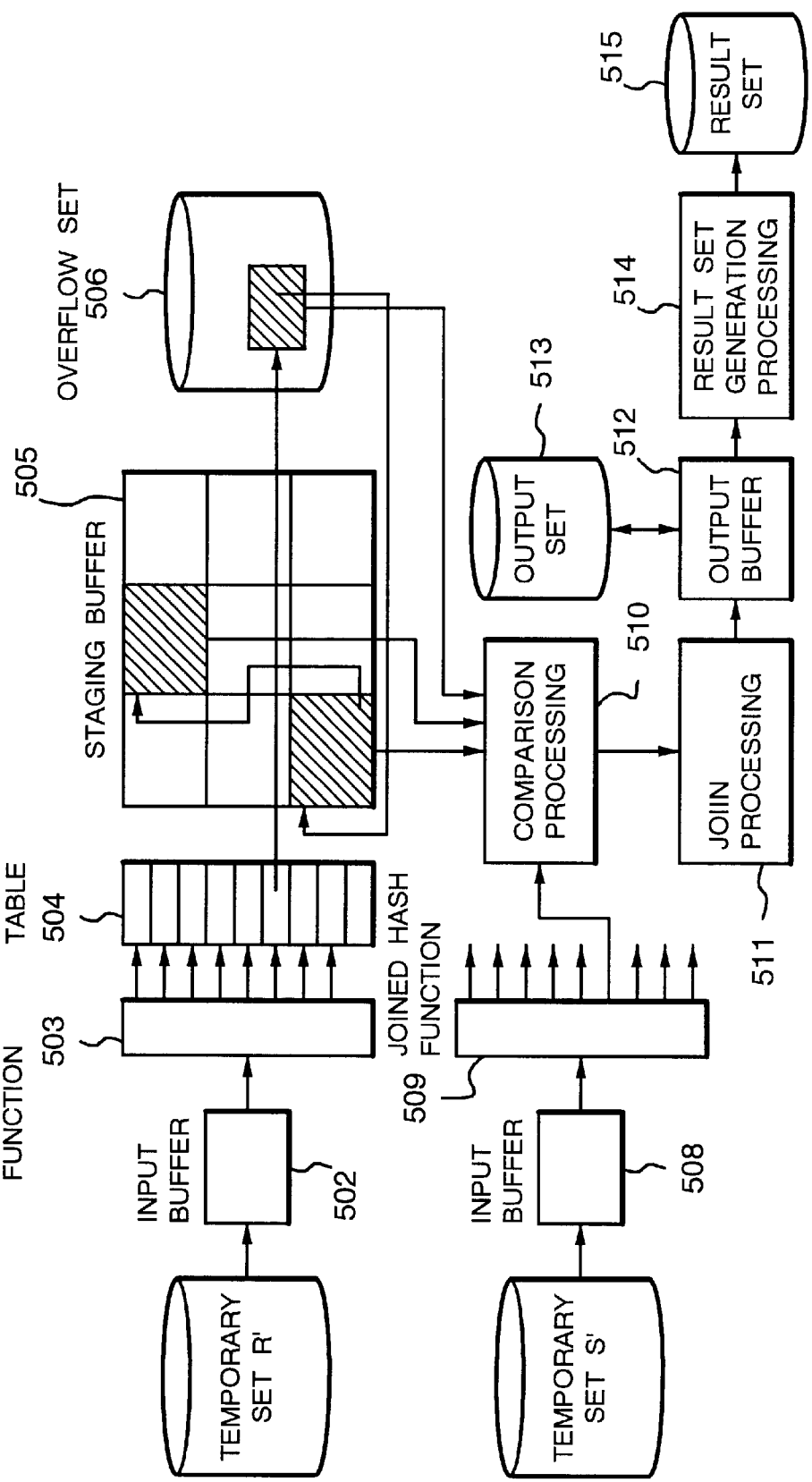
FIG. 5 is an explanatory diagram showing one example of the operation of the join phase in the join operation part of the embodiment.
Figure 6:
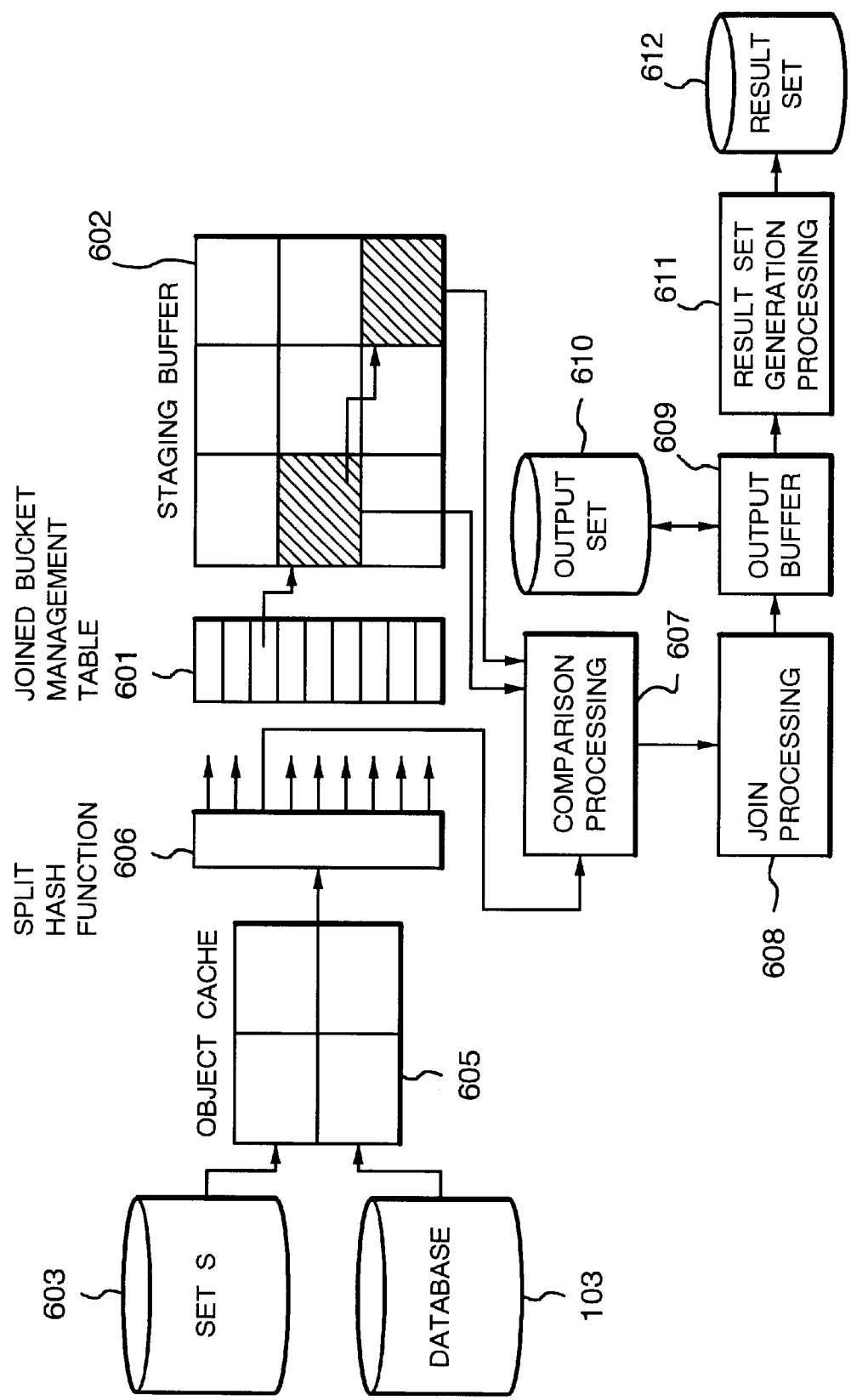
FIG. 6 is an explanatory diagram showing another example of the operation of the join phase in the join operation part of the embodiment.
Figure 7:
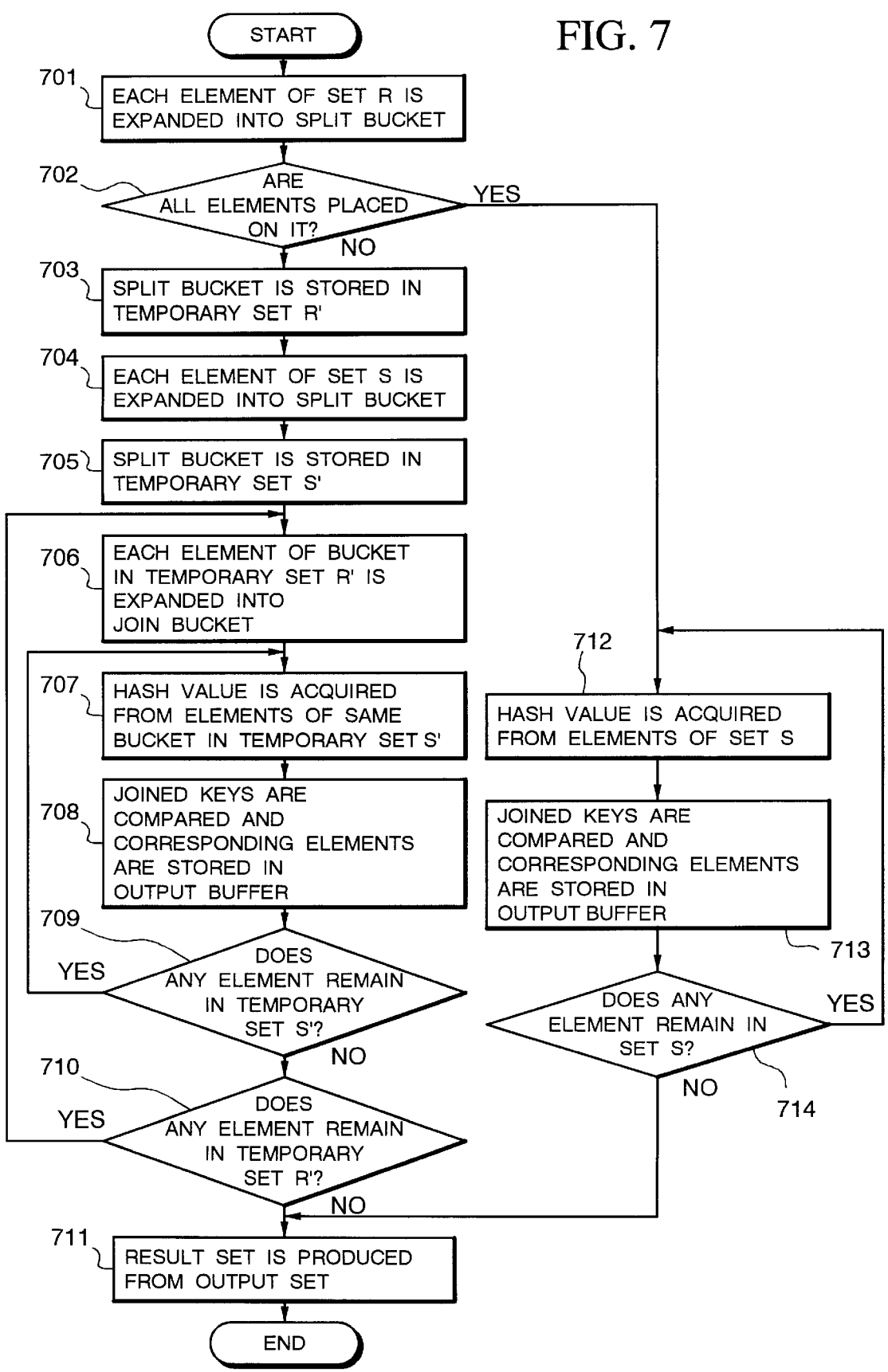
FIG. 7 is a flowchart showing the process in the join operation part of the embodiment.

When the pointer sets 107a, 107b required for the join operation are produced upon the completion of the pointer retrieval of the right and left side members of the query conditional expression, the join operation part 105 of the database access method 102 starts the join operation process with the pointer sets 107a, 107b as input information. The join operation comprises a split phase and a join phase. FIG. 7 is a flowchart showing the join operation process. FIG. 4 is an explanatory diagram of the split phase, and FIGS. 5 and 6 are explanatory diagrams of join phases. Description will be made of the operation of the join operation part 105 with reference to the drawings.

The join operation part 105 first performs the split phase. First, the object identifier (object identifier of reservation instance) contained in each pair in the pointer set 107a and the value of a concatenated key obtained from the database 103 on the basis of the pointer (pointer from the reservation instance to the name) paired with the above object identifier are newly paired and taken into an object cache 403. And, with respect to the taken pair (hereinafter referred to as the set R), a split hash function 404 is used to calculate a hash value from the value of each concatenated key and to expand into a split bucket (step 701). Here, the invention uses the multi-split method which provides many split bucket numbers.

Figure 9:
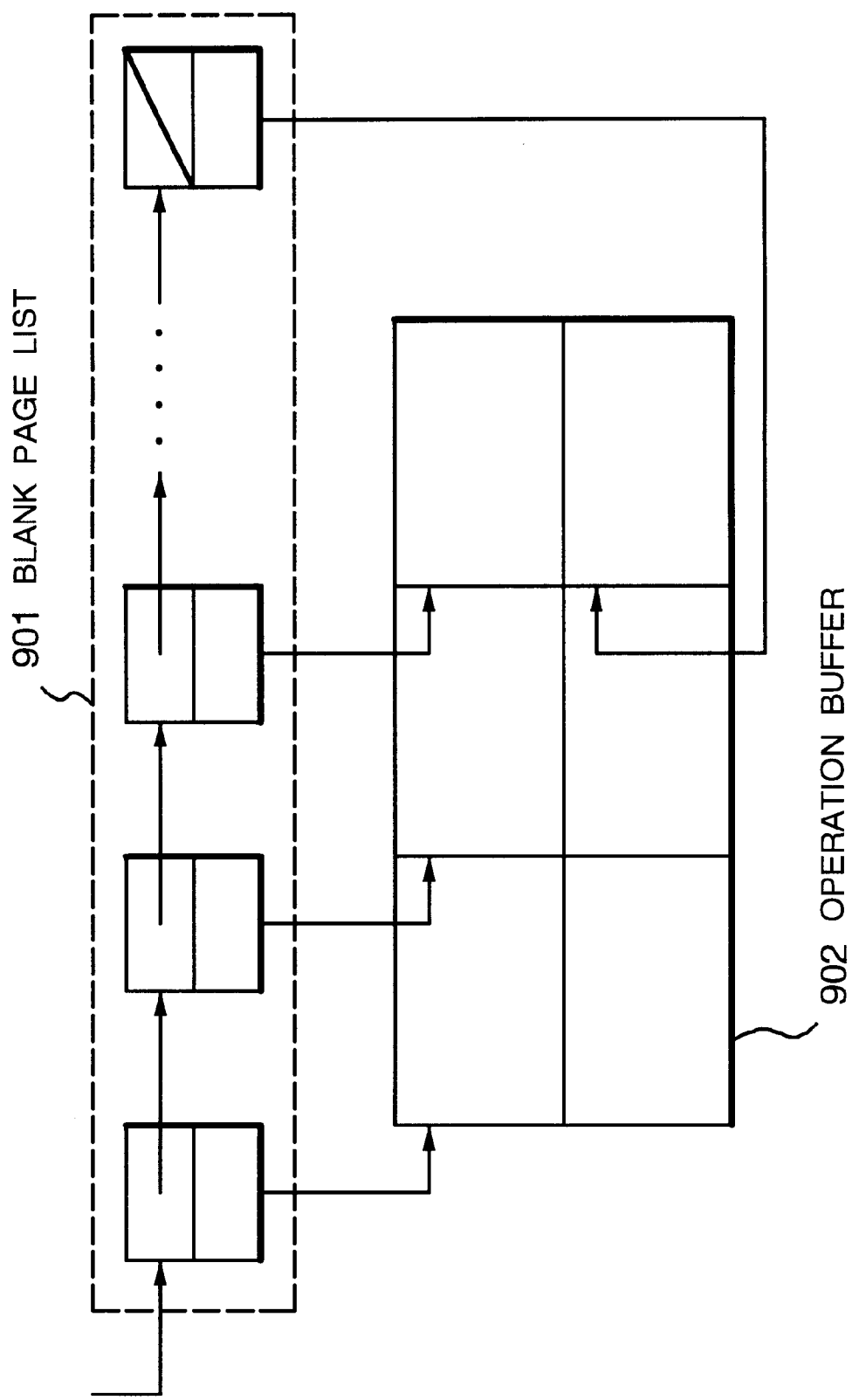
FIG. 9 is an explanatory diagram showing the blank page managing method of the embodiment.

As shown in FIG. 9, this embodiment manages each page of an operation buffer 902 by a blank page list 901. A page to be used as the split bucket is designed to be acquired from the blank page list 901 as required to improve the usage efficiency of the operation buffer 902 or the main memory. The page of the operation buffer 902 being managed by the blank page list 901 is also used for the join bucket in the join phase.

Each split bucket is managed by a split bucket management table 405, and a pair of the concatenated key value and the object identifier (the object identifier of the reservation instance) is managed on an output buffer 406. When the pair has a volume exceeding the capacity of the output buffer 406, a given page is written on a temporary set R' on a temporary file.

Subsequently, it is judged whether all pairs (all elements) after the bucket division of a set R are on the output buffer 406 (step 702), and the algorithm for the join operation is changed according to whether they are on or not. Specifically, if they are not on the output buffer 406, steps 703 to 710 are performed, and if they are on, steps 712 to 714 are performed. Each case will be described below.

(A) Process if all elements are not placed on the output buffer.

As to the set R which is not placed on the output buffer 406, a plurality of buckets are integrated by a split bucket integration process 408 and all pairs are stored in the temporary set R' (step 703).

The same manner is also employed for another set which is subjected to the join operation. Specifically, the object identifier (object identifier of employee instance) contained in each pair in the pointer set 107b and the value of a concatenated key obtained from the database 103 on the basis of the pointer (pointer from the employee instance to the name) paired with the above object identifier are newly paired and taken into the object cache 403. And, with respect to the set of the taken pair (hereinafter referred to as the set S), a split hash function (the same as the split hash function 404) is used to calculate a hash value from the value of each concatenated key and to expand into a split bucket (step 704).

Here, the buckets to be split are also large in number, and in the same manner as above, a needed page is allocated from a blank page list 901 as required. Each split bucket is also managed by the split bucket management table 405, but a pair of the concatenated key value and the object identifier (the object identifier of the employee instance) is integrated according to the split conditions of the set R. Specifically, a given page is written on a temporary set S', and a plurality of buckets are integrated by the split bucket integration process to store all pairs in the temporary set S' (step 705).

Then, the temporary set R' and the temporary set S' which are produced by the split phase are used to perform the join phase (see FIG. 5 and FIG. 7).

First, a given split bucket in the temporary set R' is read into an input buffer 502, a hash value different from the split phase is calculated from the concatenated key value of each element by a join hash function 503 to expand into the join bucket (step 706). Here, the join bucket is outputted to a staging buffer 505 which is managed by a join bucket management table 504, and written to an overflow set 506 when the join bucket exceeds the capacity of the staging buffer 505.

After the completion of staging, the same bucket in the temporary set S' 507 is read into an input buffer 508, and a hash value is calculated by a join hash function 509 from the concatenated key value of each element (step 707). Then, the joined keys for the calculated hash value and for all elements of the join bucket applicable to the calculated hash value are compared by comparison processing 510, corresponding elements are concatenated by connection processing 511, and the concatenated corresponding elements are outputted to an output set 513 via an output buffer 512 (step 708).

Steps 707 and 708 are repeated until every element in the same bucket of the temporary set S' is eliminated (step 709). Steps 706 to 709 are repeated until the buckets in the temporary R' are eliminated (step 710). Lastly, the elements (join elements containing the object identifiers of the reservation instance having the corresponding name and the object identifiers of the employee instance) in the output set 513 are collectively output as a result set 515 by result set generation processing 514 (step 711).

(B) Process if all elements are placed on the output buffer (see FIG. 6 and FIG. 7).

When all elements in the set R in split phase are placed on the output buffer, in order to avoid useless disk input/output, the split phase is suspended to enter the join phase, and a simple hash join operation is performed. In this case, the split bucket management table 405 and the output buffer 406 shown in FIG. 4 are used as a join bucket management table 601 and a staging buffer 602, respectively.

First, the object identifier (object identifier of employee instance) contained in each pair in the pointer set 107b and the value of a concatenated key obtained from the database 103 on the basis of the pointer (pointer from the employee instance to the name) paired with the above object identifier are newly paired and taken as a set S into an object cache 605. A split hash function 606 is used to calculate a hash value from the concatenated key value and to deploy in a split bucket (step 712).

Then, the joined keys for the calculated hash value and for all elements of the split bucket of the set R applicable to the calculated hash value are compared by comparison processing 607. Corresponding elements are concatenated by connection processing 608, and the concatenated corresponding elements are output to an output set 610 via an output buffer 609 (step 713).

Steps 712 and 713 are repeated until every element in the set S is eliminated (step 714). Lastly, the elements in the output set 610 are collectively output as a result set 612 by result set generation processing 611 (step 711).

Figure 8:
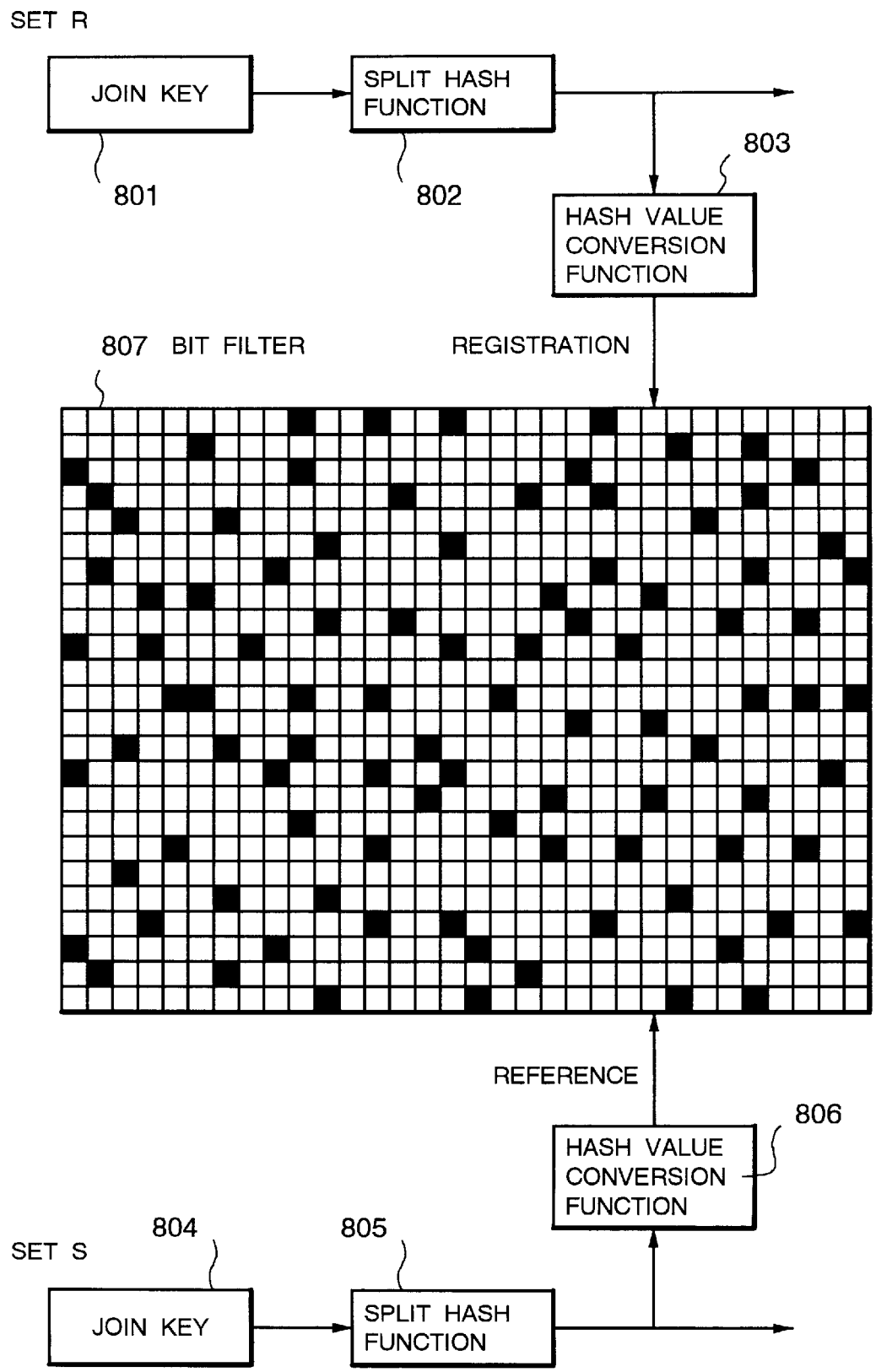
FIG. 8 is an explanatory diagram showing the bit filter processing of the embodiment.

A description will be made below of an embodiment using bit filter processing to focus on elements to be processed in the split phase by the join operation part 105. FIG. 8 is an explanatory diagram of the embodiment.

When it is assumed that the number of elements in the set S is larger than that in the set R in the split phase, a hash value calculated from a given concatenated key 801 of the set R by a split hash function 802 (the same as the split hash function 404 as shown in FIG. 4) is converted into a bit value, which has a given number as the maximum value, and registered in a bit filter 807 by a hash value conversion function (e.g., residue operation by the number of bits) 803. Black squares in the bit filter 807 shown in FIG. 8 indicate what were the hash values applicable to the set R.

A hash value calculated from a given concatenated key 804 of the set S by a split hash function 805 (the same as the split hash function 404 shown in FIG. 4) is converted into a bit value having a given number as the maximum value by a hash conversion function 806 identical to the hash conversion function 803. Reference is made to bits of the bit filter 807 corresponding to the converted bit value. When the applicable bits of the bit filter 807 are on (the black points in the drawing), the process is continued, and if not, the processing on the elements in connection with the applicable hash value of the set S is omitted.

Lastly, a bucket management method will be described with reference to FIG. 10.

Figure 10:
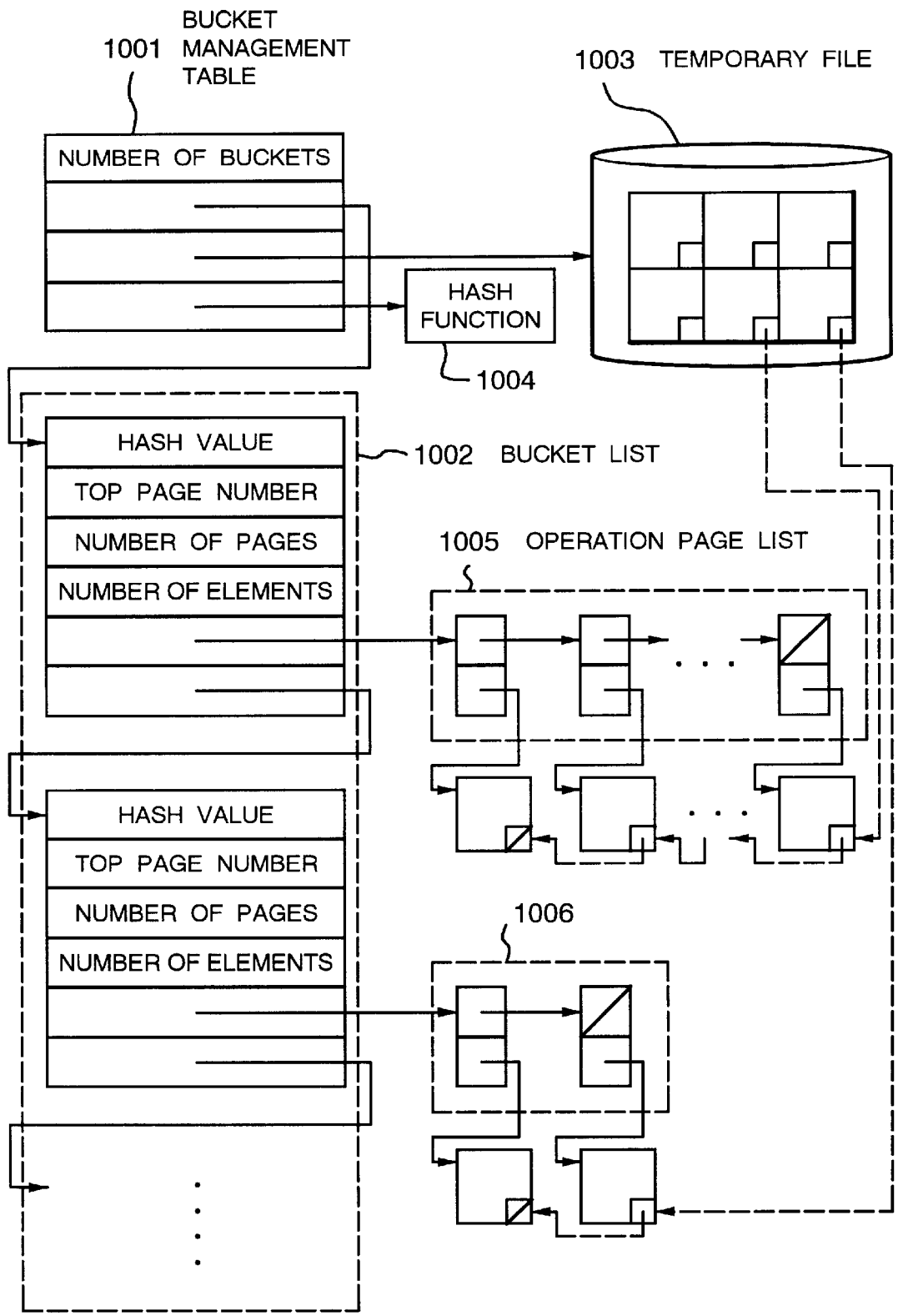
FIG. 10 is an explanatory diagram showing the bucket managing method of the embodiment.

The split bucket process described with reference to FIG. 4 and the join bucket process described with reference to FIG. 5 and FIG. 6 are managed as shown in FIG. 10.

FIG. 10 shows that a bucket management table 1001 manages the number of buckets, the pointer to a bucket list 1002, the pointer to a temporary file 1003, and the pointer to a hash function 1004. The area of memory of each bucket is managed by operation page lists 1005, 1006 and connected to each bucket list 1002. The page number of the next page is registered in the footer of the operation page and logically linked from the pages within the temporary file 1003. The top page number is registered in the bucket list 1002. Besides, the hash value, the page number and the number of elements are registered in the bucket list 1002.

For example, the bucket management table 1001 corresponds to the split bucket management table 405, the hash function 1004 corresponds to the split hash function 404, the temporary file 1003 corresponds to the temporary set R', and the used operation page corresponds to the output buffer 406 in FIG. 4.

As described above, the object-oriented database management system of the invention provides the following effects.

All pointers to the concatenated key described in the query conditional expression are retrieved from the database prior to the join operation to produce a set of pointers to the concatenated key, and the produced set of pointers is used to perform the join operation to evaluate the query conditional expression while acquiring the concatenated key value, so that a query containing a pointer reference in the conditional expression can be processed efficiently.

The input information at the join operation is not the concatenated key value itself but a set of pointers to the concatenated key, thereby allowing reduction of the memory area required for holding input information at the join operation.

The pointers (object identifiers) to be traced to obtain the concatenated key value, which is required at the time of the join operation, are acquired one by one in turn while sorting with them as keys. A pointer to the finally acquired concatenated key is stored as a pair with the object identifier which is subject to the join into the set of pointers, the disk is accessed in order of physical pages where objects to be traced are stored, and extra disk input/output, which may be caused when the same page is accessed multiple times, can be avoided.

The pages of the operation buffer to be used for the bucket are managed by the blank page list to dynamically acquire a page of the operation buffer required for the split bucket and the join bucket, improving the usage efficiency of the memory (main).

Even if data is concentrated in a certain bucket, the invention has an advantage that an overflowed bucket is rarely produced because the pages of the main memory are dynamically allocated.

The configuration using the bit filter can remove the elements not subject to the join in an early stage, and the join operation can be performed quickly.

When the elements of one of the sets to be concatenated have data expanded by the hash value of the concatenated key and all elements are placed on the main memory, the algorithm for the join operation is changed to the simple hash join operation method, thereby allowing a quick join operation with extra disk input/output being suppressed.

Since only the pair of the object identifier and the concatenated key is taken round as intermediate information, the main memory area and the secondary memory area which are required for the operation can be reduced, thereby allowing performance of the operation on a small-size computer.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed and equivalents thereof with respect to the features set out in the appended claims.

What is claimed is:

1. An object-oriented database management system for performing operation processing comprising a query processing system for controlling query processing and a database access system for accessing a database in accordance with a query from the query processing system, said database access system including:

pointer retrieving means for retrieving from the database all pointers to joined keys described in a query conditional expression produced from the query processing system, prior to a join operation, and for producing a set of pointers to the joined keys, and join operation means for performing a join operation to evaluate the query conditional expression while acquiring a concatenated key value by using the set of pointers produced by the pointer retrieving means, wherein said join operation means manages at least one pare of an operation buffer by a blank page list.

2. An object-oriented database management system as set forth in claim 1, wherein said pointer retrieving means acquires pointers to be traced to obtain the concatenated key value, which is required at the join operation, one by one in turn while sorting with the pointers as keys, and stores a pointer to the acquired concatenated key value as a pair with the object identifier which is subject to the join into the set of pointers, wherein pages of said operation buffer are dynamically acquired from the blank pave list to be used as a split bucket for storing data split based on a hash value.

3. An object-oriented database management system, for performing operation processing comprising a query processing system for controlling query processing and a database access system for accessing a database in accordance with a query from the query processing system, said database access system including:

pointer retrieving means for retrieving from the database all pointers to joined keys described in a query conditional expression produced from the query processing system, prior to a join operation, and for producing a set of pointers to the joined keys, and join operation means for performing a join operation to evaluate the query conditional expression while acquiring a concatenated key value by using the set of pointers produced by the pointer retrieving means, wherein said join operation means manages pages of an operation buffer to be used for a bucket by a blank page list, and also produces a hash value for the joined keys by using a hash function, and wherein the pages of the operation buffer are dynamically acquired from the blank page list to be used as a split bucket for storing data split based on the hash value, and holds the split bucket as a logical link of the pages split into many split bucket numbers.

4. An object-oriented database management system as set forth in claim 3, wherein said join operation means converts the hash value for the joined keys produced by using the hash function in terms of either one between two sets, which are subject to the join operation, into a converted bit value with a given number as a maximum value by a hash value conversion function, and registers the converted bit value in a bit filter, and converts the hash value for the joined keys produced by using the hash function in terms of the other set into a bit value by the hash value conversion function, and focus on elements to be processed from the converted bit values by referring to a bit file.

5. An object-oriented database management system as set forth in claim 3, wherein said join operation means manages pages of an operation buffer to be used for a bucket by a blank page list, and also dynamically acquires the pages of the operation buffer to be used for a join bucket from the blank page list and holds the join bucket as a logical link of the pages split into many split bucket numbers.

6. An object-oriented database management system as set forth in claim 3, wherein said join operation means, when the elements of one of the sets to be concatenated have data expanded based on the hash value, changes an algorithm for the join operation to be performed when all elements are placed on a main memory.

7. An object-oriented database management system as set forth in claim 3, wherein said join operation means, when it is necessary to acquire a final result according to a request from the query processing system, temporarily accumulates the result of the join operation in an output buffer and produces a result set by collecting the acquired operation results after the completion of all operations.

8. An object-oriented database management system for performing operation processing comprising a query processing system for controlling query processing and a database access system for accessing a database according to a query from the query processing system, the database access system including:

pointer retrieving means for retrieving from said database all pointers to joined keys described in a query conditional expression produced from the query processing system, prior to a join operation, and for producing a set of pointers to the joined keys, and join operation means for performing the join operation to evaluate the query conditional expression while acquiring a concatenated key value by using the set of pointers produced by the pointer retrieving means; and wherein said pointer retrieving means acquires pointers to be traced to obtain the concatenated key value, which is required at the join operation, one by one in turn while sorting with the pointers as keys, and stores a pointer to the acquired concatenated key value as a pair with the object identifier which is subject to the join into the set of pointers; and wherein said join operation means manages pages of an operation buffer to be used for a bucket by a blank page list, and also produces a hash value for the joined keys by using a hash function, wherein the pages of the operation buffer are dynamically acquired from the blank page list to be used as a split bucket for storing data split based on the hash value, and holds the split bucket as a logical link of the pages split into many split bucket numbers.

9. An object-oriented database management system as set forth in claim 8, wherein said join operation means converts the hash value for the joined keys, produced by using the hash function, in terms of either one between two sets, which are subject to the join operation, into a converted bit value with a given number as a maximum value by a hash value conversion function, and registers the converted bit value in a bit filter, and converts the hash value for the joined keys, produced by using the hash function, in terms of the other set into a bit value by the hash value conversion function, and focuses on elements to be processed from the converted bit values by referring to a bit file.

10. An object-oriented database management system as set forth in claim 8, wherein said join operation means manages pages of an operation buffer to be used for a bucket by a blank page list, and also dynamically acquires the pages of the operation buffer to be used for a join bucket from the blank page list and holds the join bucket as a logical link of the pages split into many numbers.

11. An object-oriented database management system as set forth in claim 8, wherein the join operation means, when the elements of one of the sets to be concatenated have data expanded based on the hash value, changes an algorithm for the join operation when all elements are placed on a main memory.

12. An object-oriented database management system as set forth in claim 8, wherein said join operation means, when it is necessary to produce a final result according to a request from the query processing system, temporarily stores results of the join operation in an output buffer and outputs a result set as said final result.

* * * * *